April 22, 1952 L. SPENCER 2,593,620
GUN PERFORATOR
Filed July 1, 1946
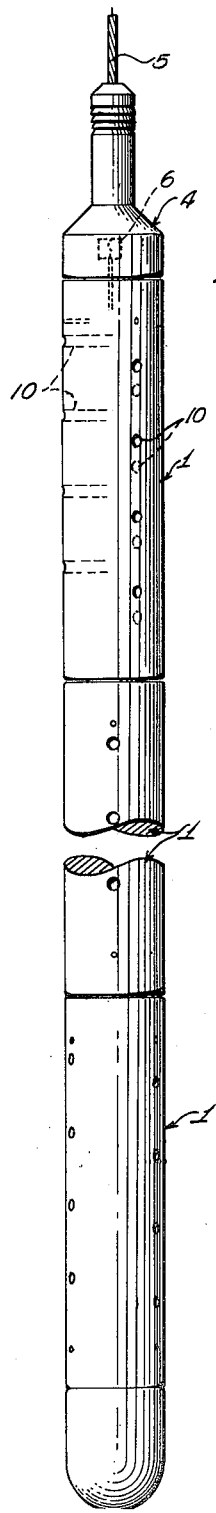
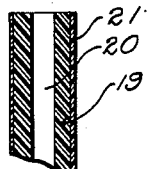
FIG.4
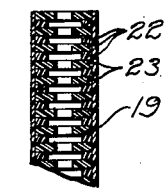
FIG.5
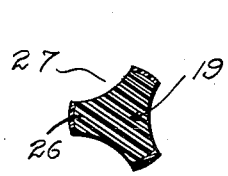
FIG.6
FIG.7
FIG.1
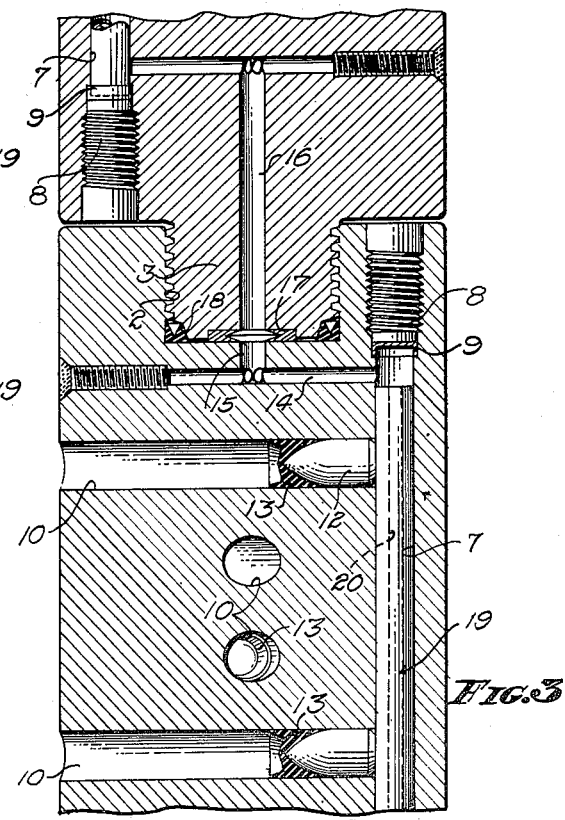
FIG.2
FIG.3
INVENTOR
Lloyd Spencer Patented Apr. 22, 1952

2,593,620

UNITED STATES PATENT OFFICE 2,593,620

GUN PERFORATOR

Lloyd Spencer, Los Angeles, Calif., assignor of 33⅓% to Thomas C. Bannon, Altadena, and 33⅓% to John D. Chesnut, Newport Beach, Calif.

Application July 1, 1946, Serial No. 680,648

3 Claims. (Cl. 164—0.5)

My invention relates to gun perforators; that is to devices designed to fire projectiles through well casing, and included in the objects of my invention are:

First, to provide a gun perforator wherein several gun bores share a common propellant bore and wherein a special propellant is provided which is so shaped in cross section as to provide a continuous flame passage throughout the length of the propellant whereby the entire length of the propellant is ignited simultaneously and burns uniformly so that the resulting pressure is evenly distributed to the projectiles contained in the several gun bores.

Second, to provide a gun perforator which accomplishes certain objectives which are highly desirable in devices of this character; namely, maximum gun bore length in relation to gun diameter, and maximum number of gun bores per unit length of the gun perforator.

With the above and other objects in view as may appear hereinafter, reference is directed to the accompanying drawings in which:

Figure 1 is a fragmentary elevational view of a gun perforator embodying my invention.

Figure 2 is an enlarged transverse sectional view thereof taken through one of the gun bores.

Figure 3 is an enlarged fragmentary longitudinal sectional view thereof.

Figure 4 is an enlarged fragmentary longitudinal sectional view of one form of propellant charge.

Figure 5 is a similar sectional view of a modified form of propellant charge.

Figure 6 is a further enlarged transverse sectional view of the propellant charge shown within a metallic wrapping.

Figure 7 is a transverse sectional view of a further modified form of the propellant charge shaped to define external flame passages.

My gun perforator comprises a series of gun body sections 1 each having a threaded socket 2 at one end and a threaded pin 3 at the other. The uppermost gun body section is screwthreaded to a cable head 4 suspended from a cable 5. The cable head may contain an electrically fired initiating charge 6 indicated by dotted lines.

Each gun body section includes axially directed propellant bores 7 which intersect the ends of the body section preferably radially outwardly of the socket 2 and pin 3 and are internally threaded at their extremities to receive end plugs 8. Suitable fluid and propellant pressure resistant seals 9 are provided at the inner ends of the plugs 8. For purposes as will be evident hereinafter, an odd number of propellant bores are provided, three bores being shown in the drawings, disposed in equally spaced relation.

Each propellant bore 7 is intersected by several laterally directed diametrically disposed gun bores 10, in the drawings three sets of gun bores are shown directed 120° apart. The gun bores are preferably slightly larger in diameter than the propellant bores so that shoulders 11 are formed at the breech ends of the gun bores.

The gun bores receive bullets 12 which seat against the shoulders 11 and are covered by seal plugs 13.

Near the ends of each gun body section are radial flame ducts 14 which intersect each other at the axis of the gun body section and communicate with the propellant bores 7. The radial flame ducts 14 are intersected by axially directed flame ducts 15 and 16 extending into the socket 2 and pin 3 respectively so that when the gun body sections are joined the ducts 15 and 16 of adjacent sections register.

The pin and socket of connected gun body sections are provided with pressure seal disks 17 surrounding the juncture of the ducts 15 and 16 as well as fluid seal rings 18. The uppermost gun body section communicates by a suitable flame duct with the initiating charge 6.

Each propellant bore 7 is adapted to receive a propellant charge 19. The propellant charge may taken the form shown in Figures 2, 3 and 4 in which the charge is in the form of a tube defining a central flame duct 20. The propellant charge is preferably a fast burning high explosive. A double base propellant known as Ballistite is suitable. The Ballistite may be an extrusion, either as a homogeneous solid or may comprise partially bonded flakes to increase the effective burning area and hence the effective rate of combustion.

In order to control the burning, the external surface of the propellant charge is coated or wrapped in an inhibitor sleeve or shell 21; for example, cellulose acetate so that the burning of the propellant will be confined to the flame duct 20. The flame duct serves to insure even ignition of the charge throughout its length so that little, if any, pressure differential is established along the propellant charge. Thus, the force opposite the several gun barrels is maintained constant, and equal acceleration of the bullets is assured.

As an alternative, the propellant charge may, as shown in Figure 5, comprise a series of disks 22 and 23 of different sizes so as to provide increased initial burning area. In this case too, the inhibitor shell 21 is desired.

It has long been recognized that some advantage is gained by introducing a delay between ignition of the propellant charge and the application of force on the bullet, particularly if the propellant pressure rise tends to be slow at first. Such time delay may be provided by encasing the propellant charge 19 in a metallic shell 24, as shown in Figure 6. The shell is preferably in the form of a split wrapping so as to facilitate removal after firing. In operation, the wrapping contains the propellant pressure until sufficient to burst the wrapping opposite the gun bores.

While the bore of the propellant shown in Figure 6 may be circular, a cross shaped bore 25 is shown to illustrate another manner of increasing the initial burning area.

While an interior flame passage is preferred, the propellant charge may, as shown in Figure 7, be solid with external ribs 26 and channels 27, the latter forming flame ducts or passages with the walls of the propellant bore.

Various changes and alternate arrangements may be made within the scope of the appended claims, in which it is my intention to claim all novelty inherent in the invention as broadly as the prior art permits.

I claim:

1. A gun perforator, comprising: a series of gun bodies, each having a threaded socket in one end and a mating threaded boss at its other end, whereby said gun bodies may be joined in end-to-end relation; each gun body defining a plurality of axially directed propellant bores, their ends intersecting the ends of said body radially outwardly of said socket and boss, axially centered end bores in said socket and boss, and lateral passages connecting said end bores and propellant bores, each gun body also defining laterally directed gun bores disposed in sets communicating with corresponding propellant bores; projectiles for said gun bores; continuous propellant cartridges for said propellant bores; plugs closing the ends of said propellant bores and confronting the ends of adjacent gun bodies; the end bores of said gun bodies adapted to register when said gun bodies are connected in end-to-end relation thereby to provide with said lateral passages and propellant bores continuous flame and interconnected passages throughout the series of gun bodies.

2. A gun perforator, involving: a series of gun bodies, each having screwthread means at the central portions of their extremities whereby said gun bodies may be joined in end-to-end relation; each gun body having a plurality of axially directed propellant bores, their ends intersecting the ends of said body radially outward of said screwthread means, each gun body also having centered end bores within said screwthread means communicating between joined gun bodies, and lateral ports communicating from said end bores to each of said propellant bores, whereby said end bores are common to said propellant bores; explosive discharge bores intersecting said propellant bores; and seal means for the extremities of each propellant bore confronting the adjacent gun body radially outwardly of said screwthread means when said gun bodies are joined in end-to-end relation, whereby the confronting end of the adjacent gun body forms an abutment preventing blowout of said seal means.

3. A gun perforator comprising: a plurality of gun bodies, each having a central screwthreaded socket in one end and a mating screwthreaded boss at the other end whereby said gun bodies may be joined serially; each gun body having explosive receiving bores extending longitudinally from end-to-end and confronting the ends of adjacent connected gun bodies radially outwardly of said sockets and bosses; seal means closing each end of each longitudinally extending bore and backed against blowout by the confronting end of the adjacent connected gun body; each gun body having flame ducts intersecting each end, centered within its boss and socket, and passages interconnecting each flame duct with each of the explosive receiving bores, whereby said explosive receiving bores have a common means of communication from one gun body to adjacent gun bodies; said gun bodies having a plurality of laterally directed gun bores intersecting each of said explosive receiving bores.

LLOYD SPENCER.

REFERENCES CITED

The following references are of record in the file of this patent:

UNITED STATES PATENTS

| Number | Name | Date |
| --- | --- | --- |
| 2,037,938 | Spencer | Apr. 21, 1936 |
| 2,145,231 | Alzner | Jan. 31, 1939 |
| 2,202,887 | Aloi | June 4, 1940 |
| 2,226,073 | Ricou | Dec. 24, 1940 |
| 2,295,634 | Collins | Sept. 14, 1942 |
| 2,360,024 | Turechek | Oct. 10, 1944 |
| 2,380,204 | Turechek | July 10, 1945 |
| 2,414,900 | Schiavon | Jan. 28, 1947 |